United States Patent [19]

Warning

[11] Patent Number: 5,062,968
[45] Date of Patent: Nov. 5, 1991

[54] APPARATUS AND PROCESS FOR FILTERING FLUIDS

[76] Inventor: Theodore A. Warning, 11227 Rippling Meadows, Houston, Tex. 77064

[21] Appl. No.: 280,673

[22] Filed: Dec. 6, 1988

Related U.S. Application Data

[63] Continuation-in-part of Ser. No. 96,634, Sep. 14, 1987, Pat. No. 4,874,533.

[51] Int. Cl.⁵ .............................................. B01D 37/02
[52] U.S. Cl. ..................... 210/771; 210/778; 210/798; 210/92; 210/93; 210/193; 210/323.2; 210/333.01; 210/411
[58] Field of Search ................ 210/777, 778, 793-795, 210/798, 93, 323.2, 333.01, 333.1, 341, 410-412, 771, 92, 193

[56] References Cited

U.S. PATENT DOCUMENTS 4,055,500 10/1977 Parker .................................. 210/412
4,704,210 11/1987 Boze et al. ........................... 210/778

Primary Examiner—Ivars Cintins
Attorney, Agent, or Firm—Thomas S. Keaty

[57] ABSTRACT

This invention relates to filtering or straining of fluids where the suspended solids removed by filtration must eventually be discharged from the filter as a "dry cake" discharge. The apparatus provides for the use of a central flow tube positioned within a filter element which is connected to a filter element drain pipe through a valve, which in case of multiple filter elements within a filtration vessel, controls draining of all elements. To assist in detecting a defective or malfunctioning filter element, a sample conduit with a sample valve is provided independently for each filter element.

16 Claims, 2 Drawing Sheets

5,062,968

APPARATUS AND PROCESS FOR FILTERING FLUIDS

This application is a continuation-in-part application of my co-pending application Ser. No. 096,634 filed Sept. 14, 1987 entitled "Apparatus and Process for Filtering Fluids", now U.S. Pat. No. 4,874,533 the disclosure of which is incorporated by reference herein.

BACKGROUND OF THE INVENTION

The apparatus and process of the present invention relate to filtration of fluids, and more specifically to filtering or straining of fluids where the suspended solids removed by filtration must eventually be discharged from the filter as "dry cake" and not as a slurry. More particularly, the apparatus and process of the present invention relate to filtering of suspended contaminants in a fluid utilizing pre-coat filtration and where the suspended solids are considered to be "hazardous wastes".

When producing oil wells, it is a common practice to pump water downhole in order to force the oil out of a formation.

Other oil producing processes require large quantities of water to be utilized, with the result of contamination of the water with oil particles and other chemicals utilized in the process and impossibility of disposing of it by simply returning it to the land formation or by draining it back into the sea in applications at offshore platforms.

Still other processes relating to the oil and gas industry and also many other industries such as the Chemical and Petro-Chemical Industries produce contaminants which are removed from a liquid stream by filtration. Many of these contaminants are considered to be "hazardous wastes" and must be rendered to a dry form for proper disposal. Therefore, it is necessary that these contaminants be discharged from the filter as "dry cake" and not in the form of a slurry wet cake as when backflushing with a fluid. Dry cake discharge requires complete removal of the liquid from the filter interior.

To overcome the problem and withdraw contaminants from the used water, various filtration methods have been used. One of the methods involves the use of a layer of filter media, which normally comprises diatomaceous earth or perlite. An example of such method is disclosed in U.S. Pat. No. 4,704,210 issued on Nov. 3, 1987 and entitled "Process and Apparatus for Filtering Fluids".

The apparatus and method of that patent utilizes a precoat filtration method, wherein a precoat layer is formed on the filter elements and the fluid to be filtered enters the vessel and exits through the filter elements, passing through the filter aid cake deposited on the exterior of the filter elements. It has been observed that as the filtration process continues, "bridging" of the cake deposited on the exterior of the filter elements may occur. In this case, the cake surrounding individual elements within a filter vessel becomes so thick, that it joins the cake which has formed on the exterior of an adjacent filter element.

When such bridging occurs, large forces are generated across the filter elements which cause element distortion or bending. Any lateral distortion of a spiral wedge-wire filter element causes the wire spacing to increase on one side, thus permitting filter cake material to exit the filter and be present in the filtrate outlet. Fracture of the elements by bridging is also possible. With other type of filter elements, wherein a plurality of apertures are formed in the body of the filter element, or other type of filter elements, the damage may demonstrate itself in breakage of the element.

Another undesirable effect has been noted, wherein one of the filter elements, for any reason, becomes damaged, and the filtrate exiting the filter element contains undesirable contaminants and solid particles which under normal circumstances are filtered out by the filter element. Once a suspended solid leakage is detected at the outlet, it is a usual practice to discontinue filtering process and check oil filter elements within the filtration vessel for leakage. This requires time and labor and adversely effects productivity of a particular filtration vessel.

Still, a further problem has been recognized, wherein during a dry cake discharge process, a certain amount of liquid is left in the filtration vessel, when pressurized air introduced into the filtration vessel forces the water remained in the filtration vessel outside of the vessel through the filter element but has no sufficient strength to force entire quantity of water from the vessel. A certain amount of water or liquid is left in the vessel within the lower portion of the filtration element, such that at least part of the coating on the filter element remains saturated with liquid and cannot be disposed of with dry cake discharge method and also this fluid mixes with the dried cake during cake discharge. If the air flow is interrupted, the cake deposited on the exterior of the lower portion of the filter element simply falls under gravity to the bottom of the vessel and cannot be properly dried prior to discharge.

It is, therefore, an object of the present invention to provide an improved apparatus and method for filtering fluids which overcomes deficiencies of the prior art.

It is another object of the present invention to provide an improved apparatus for filtering fluids, wherein each filter element within a filter vessel can be checked for malfunctioning and isolated from the process, if desired.

It is still a further object of the present invention to provide an improved filter apparatus and method, wherein substantially all liquid from the filtration vessel is removed, allowing a virtually dry cake discharge. These and other objects of the present invention will be more apparent to those skilled in the art from the following description of the invention.

SUMMARY OF THE INVENTION

The present invention achieves its objects and overcomes shortcomings of the prior art in a simple and straightforward manner. To assist in draining substantially all liquid from the filtration vessel, a supply of pressurized gas, such as air, is admitted into the vessel forcing the liquid through the filter elements to the outside of the vessel. In order to completely drain the filter elements, a filter element drain conduit is provided, connecting outlets of each filter element into a common header, which in turn is provided with a control valve, allowing discharge of the liquid from the filtration vessel, when the pressure of the air supplied into the vessel is insufficient to force the liquid adjacent lower portions of the filter elements out of the vessel through the filter elements and into the filtrate outlet which operates independently from the filter element drain conduit and is provided with separate control means. To detect and isolate a malfunctioning filter element, a sample test valve is provided for testing filtrate exiting from each filter element independently. The testing means operate independently from the filter element drain valve control means and from the filtrate outlet control means.

To dislodge the filter media layer which formed along with the contaminants, the cake on the exterior of the filter element, a supplemental backflushing reservoir is fluidly connected with the interior of the filter elements to create a backflushing shock through the interior of the filter elements to forcefully dislodge the substantially dried out cake from the filter elements and allow it to fall, under gravity, to the bottom of the vessel, which have been previously drained to remove the "heel" (liquid remaining in the vessel below the filter elements). The dry cake is subsequently discharged from the bottom of the filtration vessel by conventional method.

DETAILED DESCRIPTION OF THE PREFERRED EMBODIMENT

Figure 1:
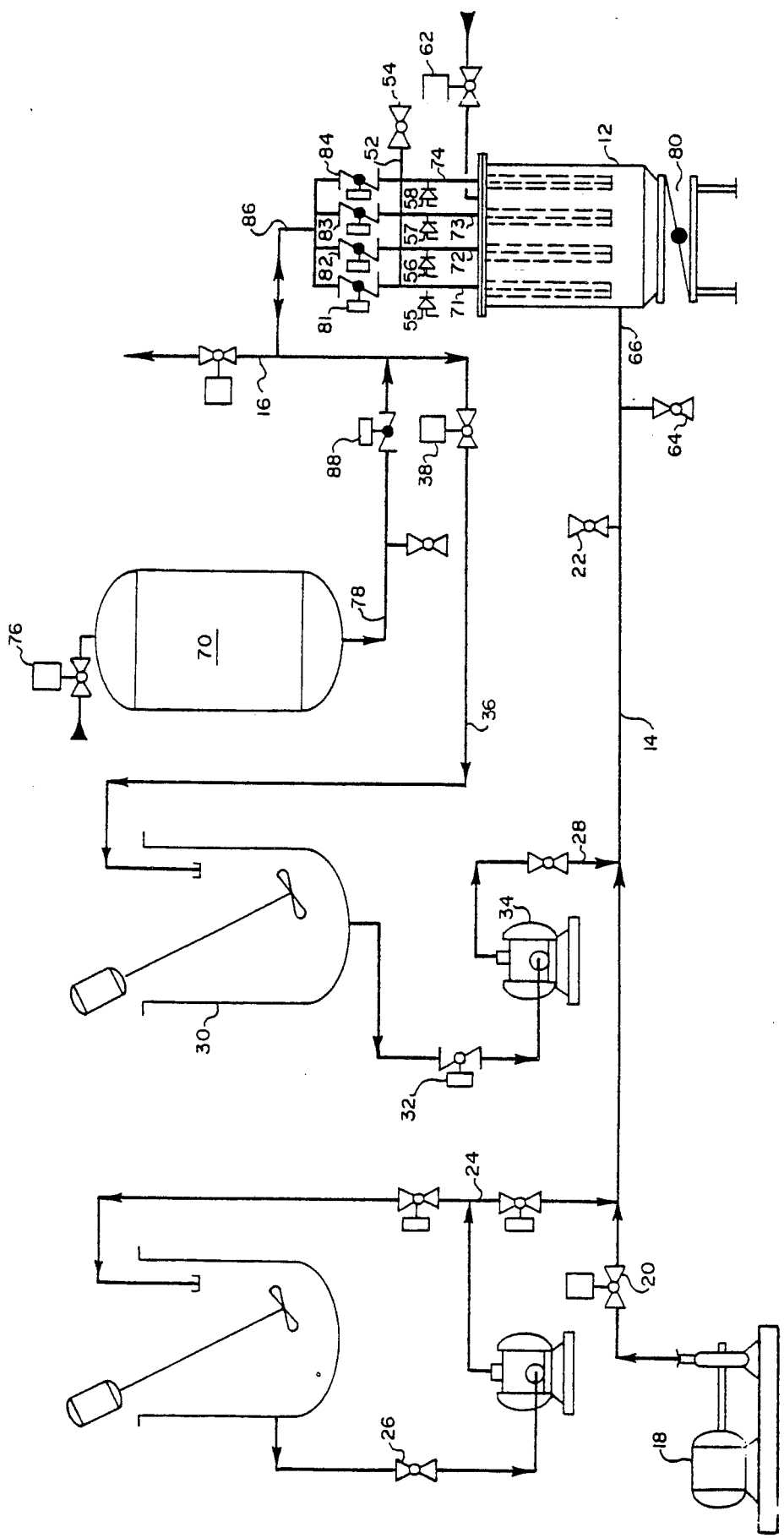
FIG. 1 is a schematic view of a system for filtering fluids in accordance with the present invention.

For a further understanding of the nature and objects of the present invention, reference will now be had to the following detailed description, taken in conjunction with the accompanying drawings in which like parts are given like reference numerals, and wherein numeral 10 designates a system in accordance with the present invention. Forming a part of the system is at least one filtration vessel 12 which has an inlet line 14 and outlet line 16. The inlet line 14 is designed to deliver contaminated fluid into the vessel. It is connected to a feed pump 18, which moves the fluid under pressure through the line 14 into the vessel 12. Feed valves 20 and 22 regulate supply of the contaminated fluid into the vessel 12.

Fluidly connected to the line 14 is a body feed line 24 which supplies a filter aid, if required, into the inlet line 14 downstream from the valve 22. A feed valve 26 controls the supply of the filter aid, such as for example, diatomaceous earth perlite, cellulose fibers and the like.

Fluidly communicating with the inlet line 14 is a precoat induction line 28 which delivers precoat media into the inlet line upstream from the filter aid line 24. A slurry of precoat media is stirred within a precoat tank 30 and is admitted, through the valve 32, into the pump 34 and under pressure into the inlet line 14.

A precoat return line 36 allows return of the unused precoat media back into the precoat tank 30 through operation of the valve 38.

Figures 2, 3:
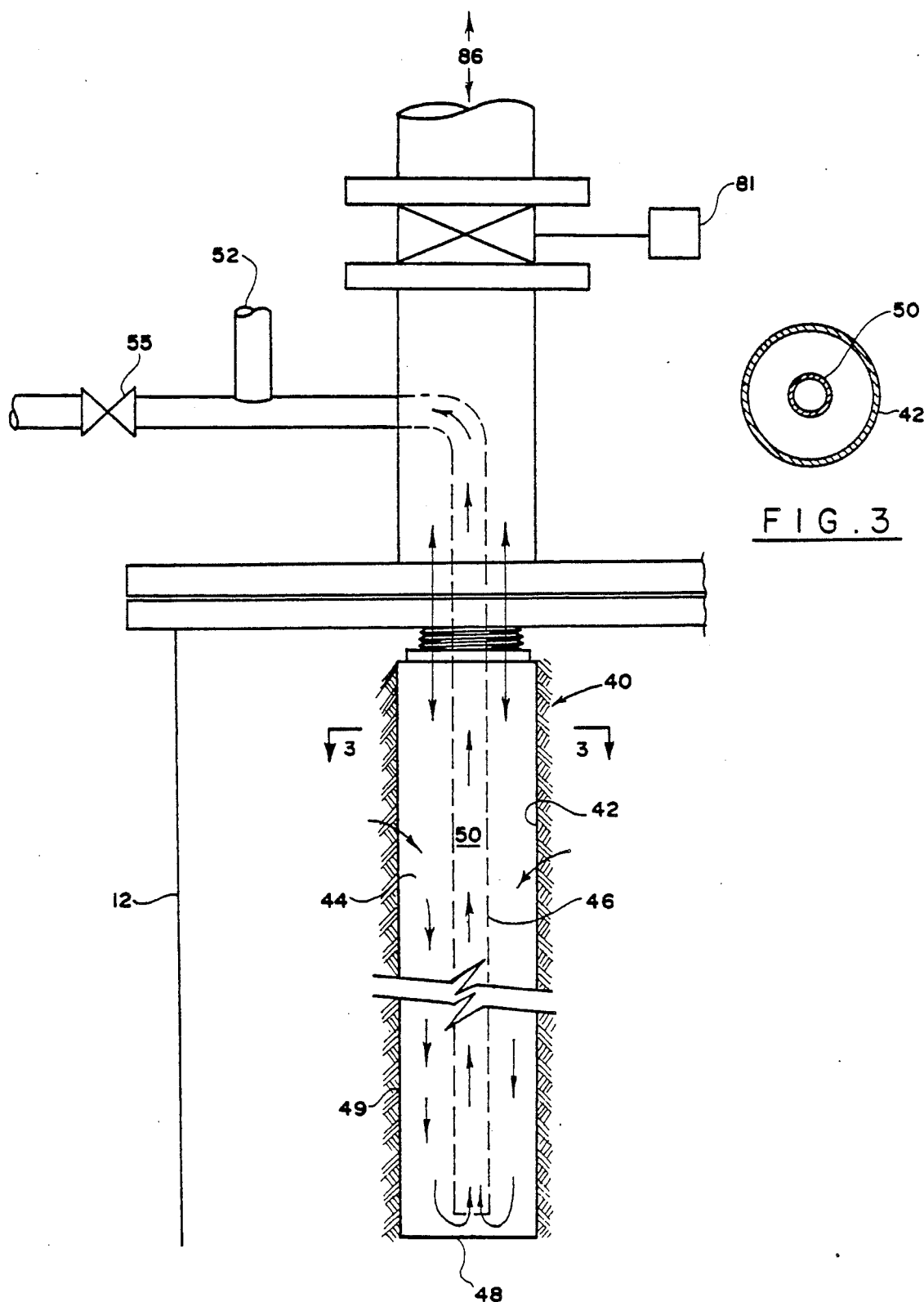
FIG. 2 is a schematic view of the filter element utilized in the system of the present invention, illustrating a fluid flow within the filter element.
FIG. 3 is a cross sectional view taken along lines 3—3 of FIG. 2.

Suspended within a filtration vessel 12 are filter elements 40, which can be one or more in number. As illustrated in FIG. 2, each filter element 40 comprises an elongated body 42, with substantially hollow interior, wherein a fluid chamber 44 is formed. Mounted within the chamber 44 is a central flow tube 46 which extends downwardly through the length of the filter body 42 and terminates a distance above the bottom 48 thereof. An inner flow space 50 is formed within the central flow tube 46, which communicates with the exterior of the filter element, with each of the filter elements 40 being connected to a drain conduit 52 through a common valve 54. Additionally, each filter element has a valve mounted on the outlet of the central flow tube 46, for taking samples from each element of undesirable contaminants are detected in the outlet 16 of the vessel 12. The sample valves 55, 56, 57 and 58 are each manually or automatically operated to take samples from each filter element and to determine performance of the element. Should an element become damaged, that element can be easily identified by taking samples through opening of each individual sample valve 55–58 and eliminated from the filtration process, such that no filtrate exits the element to which one of the valves 55–58 is connected. Thus, when suspected solid particle leakage is detected on the outlet, the sample valves 55–58 are operated for test purposes and to disconnect the defective filter element from the operative line.

As shown in FIG. 2, the element 40 is precoated with precoat media, such as for example, diatomaceous earth, which was introduced into the filter media and delivered through the inlet line 14 into the interior of the vessel 12. The filter media adheres to the exterior of the body 42 and, along with filtered out solid contaminants, forms a cake or a layer 49. A direction of fluid flow within the filter element 40 is shown by arrows in FIG. 2. The filtered liquid passes through the pre-coat layer, penetrates through the wall of the body 42 into the chamber 44. The filtrate moves downwardly and upwardly around the central flow tube 46 into the conduit 86 (common outlet line) or through the interior of the central flow tube 46 upwardly to filter element drain conduit 52 and to a conduit leading to a sample valve 55 which is individual for each filter.

As filtration process continues, the layer 49 increases in thickness around the body 42 in a substantially uniform layer. The thickness of the "cake" formed with the precoat layer 49 reaches an undesirable level, when "bridging" of the cakes formed on the adjacent filter elements may occur.

Periodically, the accumulated cake must be removed from the filter in which case, the vessel 12 is disconnected from the inlet line 14 by the inlet valve 22 and the filter elements 40 are prepared for cleansing. An air inlet valve 62 is opened, admitting pressurized air into the vessel 12 and displacing the water which have accumulated in the vessel 12 through the cake layer formed on the filter elements into the chamber 44, then downwardly to the bottom 48 of the filter element 40 and upwardly through the central flow tube 50, draining elements through the outlet line 16 and at least in part through the line 52 and the element drain valve 54. With the previous method, the water was displaced from the vessel 12 to a level of the lower portion of the elements 40, leaving an undesirable quantity of liquid within the lower portion of elements 40. With the provision of the element drain line 52 controlled by the element drain valve 54, substantially all water is displaced from the elements 40, thus allowing to continue induction of air into the vessel 12 until such time when the cake is virtually dry. The air pressure delivered into the vessel 12 also assists in retaining the cake on the exterior of the element 40, which in the absence of the pressure differential across the elements 40 may fall down under gravity to the bottom of the vessel 12 without completely drying.

Once the water level is below the elements 40, the remaining water ("heel") is drained through opening of the drain valve 64 connected to a drain line 68 exiting the vessel 12 adjacent a bottom of the vessel. The air is continuously supplied to the vessel 12 while draining process is taking place.

Once all water has been drained from the vessel 12, the "heel" valve 64 is closed, while the air continues to enter the vessel 12 drying the cake 49. After a predetermined period of time, the air inlet valve 62 is closed while the cake still adheres to the exterior of the elements. At that time, all valves are closed and the vessel is isolated from the inlet and the outlet.

To dislodge the cake formed on the exterior of the elements 40, a pressure shock must be created from within the elements 40 to forcefully remove the cake from the elements 40. A supplemental backflushing reservoir 70 is provided in fluid communication with the lines 71, 72, 73 and 74 which serve as outlets of the central flow tube 46. The air is admitted into the vessel 70 through the air inlet line 76 and is pressurized until a predetermined value of pressure is reached in the vessel 70. At that time, a cake discharge valve 80 on the bottom of the vessel 12 is opened. Filter element service valves 81, 82, 83 and 84 installed in the lines 71, 72, 73 and 74, respectively are also opened. The valves 81–84 are installed upstream from the valves 55–58 and are connected to a common outlet line 86 leading to the filtrate outlet line 16.

When a valve 88, which regulates an air discharge line 78 of the backflushing vessel 70 is opened, it rapidly discharges a large volume of pressurized air into one of the elements 40 through any of the chosen valves 81, 82, 83 or 84, in sequence. The cake is violently dislodged from the elements 40 and falls under gravity into the bottom of the vessel 12 and exits through the discharge valve 80. This procedure is repeated for all elements 40 through opening valves 81, 82, 83 and 84 in turn.

The filter elements 40 are now clean and a new batch of filter media can be admitted into the vessel 12, so that filtration process can be resumed.

Many changes and modifications in the above-described embodiment of the invention can be carried out without departing from the spirit and scope thereof. I, therefore, pray that my rights to the present invention be limited only by the following claims.

I claim:

1. An apparatus for filtering contaminated fluid, comprising:
   a vessel having a filtration space therein;
   means for introducing a contaminated fluid into the vessel;
   means for introducing a filter media into the vessel;
   a plurality of filter elements, each having an interior and an exterior, positioned inside the vessel, each filter element being provided with an individually controllable means for testing filtrate on an outlet of the filter element;
   means for forming a layer of filter media on the exterior of the filter elements;
   means for removing filtrate from the interior of the filter elements; and
   means for draining the filter elements in fluid communication with the interior of the filter elements operable independently from the means for removing filtrate.

2. The apparatus of claim 1, wherein said plurality of filter elements has a common means for draining provided with a drain valve means.

3. The apparatus of claim 2, wherein said means for removing filtrate comprises an outlet valve means in fluid communication with the interior of the filter element, said outlet valve means being regulated independently from said drain valve means.

4. The apparatus of claim 1, wherein said means for testing filtrate comprises a sample valve means operable independently from said means for removing filtrate and said means for draining the filter element.

5. The apparatus of claim 1, further comprising means for introducing pressurized gas into the vessel to pressurize contents of the vessel and facilitate removal of substantially all fluid from the vessel in cooperation with the means for draining the filter elements and to facilitate drying of the filter media.

6. The apparatus of claim 5, further comprising means for removal of substantially dry filter media from the vessel.

7. The apparatus of claim 6, wherein said means for removal of the filter media comprise a supplemental pressurizing vessel in fluid communication with the interior of the filter elements for backflushing the filter elements and dislodging the filter media settled on the exterior of the filter elements.

8. A method for filtering a contaminated fluid, comprising the steps of:
   providing a filtration vessel having a filtration space;
   providing means for delivering the contaminated fluid into the filtration vessel;
   providing a source of filter media and means for delivering the filter media into the filtration vessel;
   providing at least one filter element inside the filtration vessel, said filter element having an interior and exterior;
   providing a means for removing filtrate from the filtration vessel in fluid communication with the interior of the filter element;
   delivering the contaminated fluid and the filter media into the filtration vessel and forming a layer of the filter media on the exterior of the filter element;
   removing filtrate from the interior of the filter element;
   interrupting a flow of fluid into the filtration vessel;
   providing a filter element draining means in fluid communication with the interior of the filter element independently from said means for removing filtrate;
   introducing a flow of pressurized gas into the vessel to force substantially all fluid in the vessel to exit the filtration vessel at least in part through the filter element draining means and to substantially dry out the layer of the filter media;
   providing a supplemental backflushing vessel containing pressurized backflushing media in fluid communication with the interior of the filter element;
   forcing the backflushing media through the filter element dislodging the filter media settled on the exterior of the filter media; and
   removing the dislodged filter media from the filtration vessel.

9. The method of claim 8, further comprising a step of providing a means for testing filtrate on an outlet side of the filter element, said means comprising a sample valve means operable independently from said means for removing filtrate and said means for draining.

10. The method of claim 8, comprising a step of providing a plurality of filter elements within the filtration vessel.

11. An apparatus for filtering contaminated fluid, comprising:
a vessel having a filtration space therein;
means for introducing a contaminated fluid into the vessel;
means for introducing a filter media into the vessel;
a plurality of filter elements, each having an interior and an exterior positioned inside the vessel, each filter element being provided with individually controllable means for testing filtrate on an outlet side of each filter element;
means for forming a filter media on the exterior of each filter element;
means for removing filtrate from the interior of the filter elements;
means for draining the filter elements in fluid communication with the interior of the filter elements operable in cooperation and independently from the means for removing filtrate; and
wherein said means for testing filtrate comprise a sample valve means operable independently from said means for removing filtrate and from said means for draining.

12. The apparatus of claim 11, wherein said plurality of filter elements has a common means for draining provided with a drain valve means.

13. The apparatus of claim 12, wherein said means for removing filtrate comprises an outlet valve means in fluid communication with the interior of the filter elements, said outlet valve means being regulated independently from said drain valve means.

14. The apparatus of claim 11, further comprising means for introducing pressurized gas into the vessel to pressurize contents of the vessel and facilitate removal of substantially all fluid from the vessel in cooperation with the means for draining the filter element and to facilitate drying of the filter media.

15. The apparatus of claim 11, further comprising means for removal of substantially dry filter media from the vessel.

16. The apparatus of claim 15, wherein said means for removal of the filter media comprises a supplemental pressurizing vessel in fluid communication with the interior of the filter element for backflushing the filter element and dislodging the filter media settled on the exterior of the filter elements.

* * * * *